(12) United States Patent
Bezerra De Melo et al.

(10) Patent No.: US 11,629,590 B2
(45) Date of Patent: Apr. 18, 2023

(54) METHOD FOR ESTIMATING EITHER FLOWBACK OR THE RESERVOIR FLUID PRODUCTION RATE FROM EITHER ONE INDIVIDUAL INLET OR THE CONTRIBUTION FROM SEVERAL INLETS SEPARATED BY INTERVALS IN A WELLBORE LOCATED IN AN OIL AND/OR GAS RESERVOIR

(71) Applicant: REPSOL, S.A., Madrid (ES)

(72) Inventors: Ricardo Cesar Bezerra De Melo, Madrid (ES); Ramy Nabil Eid, Madrid (ES)

(73) Assignee: REPSOL, S.A., Madrid (ES)

( * ) Notice: Subject to any disclaimer, the term of this patent is extended or adjusted under 35 U.S.C. 154(b) by 0 days.

(21) Appl. No.: 17/045,174

(22) PCT Filed: Apr. 5, 2019

(86) PCT No.: PCT/EP2019/058657
§ 371 (c)(1),
(2) Date: Oct. 4, 2020

(87) PCT Pub. No.: WO2019/193162
PCT Pub. Date: Oct. 10, 2019

(65) Prior Publication Data
US 2021/0131270 A1    May 6, 2021

(30) Foreign Application Priority Data

Apr. 6, 2018 (EP) ................................ 18382233

(51) Int. Cl.
*E21B 47/10* (2012.01)
*E21B 47/12* (2012.01)
*G01F 1/56* (2006.01)

(52) U.S. Cl.
CPC .............. *E21B 47/10* (2013.01); *E21B 47/12* (2013.01); *G01F 1/56* (2013.01)

(58) Field of Classification Search
CPC ............. E21B 47/10; E21B 47/12; G01F 1/56
See application file for complete search history.

(56) References Cited

U.S. PATENT DOCUMENTS 6,971,265 B1   12/2005  Sheppard et al.
9,828,851 B1   11/2017  Bonavides
(Continued)

FOREIGN PATENT DOCUMENTS

EP       1086294 A1     3/2001
WO       WO99661 A1    12/1999

*Primary Examiner* — Tarun Sinha
*Assistant Examiner* — Yossef Korang-Beheshti
(74) *Attorney, Agent, or Firm* — Hultquist, PLLC; Steven J. Hultquist

(57) ABSTRACT

A method is described for estimating either flowback or the reservoir fluids production rate from either one individual inlet or the contribution from several inlets separated by intervals in a wellbore located in an oil and/or gas reservoir. The wellbore may include a casing with a plurality of magnetic irregularity elements, such as casing collars, to generate magnetic perturbations within the casing. In the method, one or more sensor elements are delivered in such a way that the flow drags them while the sensor elements record in time the magnetic perturbations generated by the magnetic irregularity elements. The known location of the magnetic irregularity elements and the reading of perturbations enables estimating the velocity of the sensor element(s) along the path direction of the casing, to determine the velocity of the fluid.

15 Claims, 3 Drawing Sheets

(56) References Cited

U.S. PATENT DOCUMENTS

| | | | |
|---|---|---|---|
| 2002/0097637 A1* | 7/2002 | Pearce | G01V 1/201 367/154 |
| 2003/0233873 A1* | 12/2003 | Standen | E21B 44/00 73/152.48 |
| 2005/0241824 A1* | 11/2005 | Burris, II | E21B 23/10 166/255.1 |
| 2011/0186290 A1* | 8/2011 | Roddy | E21B 47/10 166/253.1 |
| 2011/0203791 A1* | 8/2011 | Jin | E21B 17/042 166/244.1 |
| 2014/0262236 A1 | 9/2014 | Walton et al. | |
| 2015/0330212 A1* | 11/2015 | Sassi | A61B 5/05 166/250.1 |
| 2015/0354340 A1* | 12/2015 | Mouget | E21B 47/01 166/250.11 |
| 2016/0097260 A1* | 4/2016 | Tolman | E21B 43/267 166/312 |
| 2019/0071963 A1* | 3/2019 | Sites | E21B 47/26 |
| 2019/0265384 A1* | 8/2019 | Jurczyk | G01V 5/145 |

* cited by examiner

METHOD FOR ESTIMATING EITHER FLOWBACK OR THE RESERVOIR FLUID PRODUCTION RATE FROM EITHER ONE INDIVIDUAL INLET OR THE CONTRIBUTION FROM SEVERAL INLETS SEPARATED BY INTERVALS IN A WELLBORE LOCATED IN AN OIL AND/OR GAS RESERVOIR

CROSS-REFERENCE TO RELATED APPLICATIONS

This is a U.S. national phase under the provisions of 35 U.S.C. § 371 of International Patent Application No. PCT/EP2019/058657 filed Apr. 5, 2019, which in turn claims priority under 35 U.S.C. § 119 of European Patent Application No. 18382233.7 filed Apr. 6, 2018. The disclosures of such international patent application and European priority patent application are hereby incorporated herein by reference in their respective entireties, for all purposes.

DESCRIPTION

Field of the Invention

The present invention is related to a method for estimating either flowback or the reservoir fluid production rate from either one individual inlet or the contribution from several inlets separated by intervals in a wellbore located in an oil and/or gas reservoir. This invention enables the optimization of the number of the inlet intervals and to maximize production.

The wellbore according to the invention comprises a casing with a plurality of magnetic irregularity elements, being embodied as ferromagnetic irregularity elements, specifically as casing collars in a preferred example of the invention.

These magnetic irregularity elements generate magnetic perturbations within the casing. According to the method, one or more sensor elements are delivered in such a way that the flow drags them while the sensor elements record in time the magnetic perturbations generated by the magnetic irregularity elements.

The location of the magnetic irregularity elements is known and the reading of perturbations allows estimating the velocity of the sensor element along the path direction of the casing, specifically the evolution of said velocity, and then extrapolate the velocity of the fluid.

In a further step, recorded data is retrieved from sensor elements, for instance when exiting the wellbore, and further processed for estimating the flow rate along the path from the delivering location within the casing.

Prior Art

One of the technical fields with a more intensive development is the one focused on collecting data from a wellbore during the production life or during the initial fracture flowback fluid.

Collecting data from a wellbore is a challenging task as the wellbore shows a very limited space having access only through the main opening. Many of the elements that are installed in the wellbore can be installed only when building it.

According to the prior art, some parameters such as temperature or pressure are measured by installing temperature sensors or pressure sensors in the casing and they are communicated with an external data collecting device by wire or even by wireless communication means. These parameters can be measured at any point of the casing and, in some specific flow conditions the flow velocity may be poorly estimated by using correlations or numerical models depending on these parameters.

The fluid flow shows a velocity variation along the path direction of the casing, being this path extended from the inner end of the wellbore to the opposite end, the outlet of the wellbore. Throughout the description, the path of the wellbore will be the main axis of the casing. If the casing shows a circular section, the axis will be located at the center of said circular section.

Throughout the description, a cross sectional plane will be a cross section taken according to a plane perpendicular to the path of the wellbore.

During production the flow is entering from the reservoir to the inner space of the casing through a plurality of inlet ports located in the casing. The inlet flow entering through the plurality of inlet ports increases progressively the flow along the path direction from the inner end to the outlet of the wellbore. In an initial fracture flowback process this flow is flowing in the opposite direction.

The variation of the flow depending on the contribution of each of the inlet port cannot be accurately estimated by using temperature and/or pressure sensors and numerical models or any other indirect method.

It is known in the prior art the use of flow scanner tools which comprises a plurality of helical turbines located in a movable structure intended for being introduced in the wellbore. The helical turbines determine the velocity of the flow along the radial direction at certain location of the path of the wellbore.

This scanner tools is a complex device that requires additional tools allowing to introduce the scanner in the wellbore, to locate it in the correct location and to collect the measured velocities. This scanner cannot be used at any time of the production process and show complex elements inferring in the flow by generating waves.

Additionally, the fluid flow within the casing is complex as it shows a very relevant boundary layer showing a velocity profile highly dependent on the composition of the fluid. In particular, the flow may show two or more phases that are separated according to the cross sectional plane of the casing.

The invention solves these problems using very simple elements but providing a very reliable method for estimating the flowback or the reservoir fluid production rate.

DESCRIPTION OF THE INVENTION

The present invention is a method for estimating either flowback or the reservoir fluid production rate from either one individual inlet or the contribution from several inlets separated by intervals in a wellbore located in an oil and/or gas reservoir, said wellbore being extended along a path at least from a point of the surface of the reservoir until a point in the subsurface.

According to the invention, the wellbore comprises:
   a casing comprising a plurality of inlet ports distributed according to a first arrangement along the path allowing the entrance of fluid into the casing and, the casing also comprising a plurality of magnetic irregularity elements distributed according to a second arrangement along the path;
   at least one sensor element wherein the sensor element is adapted to record in time the magnetic perturbation generated by a magnetic irregularity element when the at least one sensor element is moving within the casing and passing through a section of the wellbore where the said magnetic irregularity element is located according to the path direction.

The casing is housed in the wellbore providing a wall being the interface between the inner space of the wellbore and the reservoir. The casing has a plurality of inlet ports being in most cases holes or grooves allowing fluids to cross the wall of the casing. These inlet ports are named "inlet" rather than "inlet/outlet" port but said inlet ports must be interpreted in a general meaning (inlet/outlet) as ports allowing the flow to pass through in any direction. In a preferred embodiment, at a determined location of the path, the inlet port is a set of grooves or holes distributed peripherally in the casing at a determined location of the path.

The plurality of inlet ports are arranged in the casing along the path direction of the wellbore according to a first arrangement, being this first arrangement for instance clustered by groups of inlet ports, each group located at certain coordinate along the path direction, being each pair of two consecutive groups separated according to a first distance, resulting in an equidistributed arrangement in most of the embodiments.

Distance between two groups may be reduced if the flow crossing the wall of the casing needs to be higher in a certain portion of the casing. Each group of inlet ports located at a location of the path may be peripherally distributed around the casing.

The casing also comprises a plurality of magnetic irregularity elements distributed along the path of the wellbore according to a second arrangement. This second arrangement may not be correlated with the first arrangement of inlet ports. In the preferred embodiment the second arrangement is such that the magnetic irregularity elements (C) are equally distributed along the path (P) direction.

According to a preferred embodiment, the casing is made of tube portions of ferromagnetic material connected consecutively. Each tube portion shows one end with a collar showing an inner diameter wider than the rest of the tube portion and adapted to receive the end with no collar of the adjacent tube portion. The casing collar shows a higher amount of mass generating a magnetic perturbation in the inner space of the casing. For instance, the magnetic perturbation is a perturbation of the magnetic field of the earth.

According to another embodiment, this magnetic perturbation may be provided by other ferromagnetic irregularity elements fixed to the casing, for instance additional pieces of ferromagnetic material, located at known coordinates along the path direction.

According to another embodiment, the magnetic irregularity elements are magnets, permanent magnets or electromagnets, generating a magnetic perturbation.

The method also comprises the use of at least one sensor element, being this sensor element a device that is being dragged by the fluid flowing through the inner space of the casing. This sensor is configured to record in time the magnetic perturbation generated by any magnetic irregularity element of the casing when moving within the casing and passing through a section of the wellbore where said magnetic irregularity element is located according to the path direction.

That is, the magnetic irregularity element may be fixed to one side of the wall of the casing but, in any case, the position of said magnetic irregularity element is determined by the position along the path direction. Most of the casings of wellbores show a circular section, wherein in these cases the path direction is identified as the longitudinal axis of the wellbore passing through the center of each circular section of the casing.

According to other embodiments, the sensor element is active and generates a magnetic field that is perturbed by the magnetic irregularity elements. The sensor element records in time the measured perturbation.

In any case, the sensor element is recording the presence of any perturbation of the magnetic field. This perturbation determines that the sensor element being dragged by the flows has passed through a section of the casing where a magnetic irregularity element is located.

According to the method, the following steps are carried out:
  delivering at least one sensor element in the wellbore within the casing during either flowback or the production of fluid at a location of the wellbore located in the subsurface and where the fluid flows, being the sensor element dragged by the flow;
  recording with the at least one sensor the magnetic perturbations caused when the sensor element dragged by the flow passes near each magnetic irregularity element; and,
  collecting the recorded data from the at least one sensor element.

The sensor element is delivered at a location where the fluid flows; for instance by delivering the sensor element at a location having inlet ports between the end of the casing and the delivery location providing an inlet or outlet flow.

The sensor element is dragged by the fluid wherein the velocity of the sensor element is almost the velocity of the surrounding fluid, especially if the density of the sensor is about the density of the surrounding fluid. This fact allows determining the estimation of the velocity of the fluid flow as the velocity of the sensor element being dragged by said flow.

The trajectory of a sensor element along the path direction of the wellbore runs near a plurality of magnetic irregularity elements. During the travel time, the sensor element is recording any magnetic perturbation, in particular the magnetic perturbation caused by each magnetic irregularity element.

The location of the magnetic irregularity elements is known. After collecting the recorded data from the sensor element the location of each magnetic irregularity element causing each magnetic perturbation is identified with a timestamp, being the timestamp the time assigned by the sensor element when detecting the associated magnetic perturbation.

As the location where the sensor element is delivered and the delivery time are known, timestamps allow calculating the travel time from the delivery instant until the sensor element has passed near each of the magnetic irregular element.

The velocity of the sensor between two adjacent magnetic irregular element locations is estimated as the quotient of the distance between said two locations and the travel time spent for traveling said distance. The travel time spent for traveling said distance is calculated as the difference between the two timestamps associated to the two magnetic irregularity elements.

The method allows estimating the velocity of the flow for each portion of the path between locations of magnetic irregularity elements generating a magnetic perturbation. When the velocity between two adjacent portions of the path is different, said difference is associated to the inlet/outlet flow through any of the inlet/outlet ports located in the two adjacent portions.

The detailed description of the invention will disclose some specific preferred embodiments.

DESCRIPTION OF THE DRAWINGS

These and other features and advantages of the invention will be seen more clearly from the following detailed description of a preferred embodiment provided only by way of illustrative and non-limiting example in reference to the attached drawings.

DETAILED DESCRIPTION OF THE INVENTION

As will be appreciated by one skilled in the art, aspects of the present invention may be embodied as a method and a system allowing estimating either flowback or the reservoir fluid production rate from one or individual contribution from several intervals in a wellbore located in an oil and/or gas reservoir.

Figure 1:
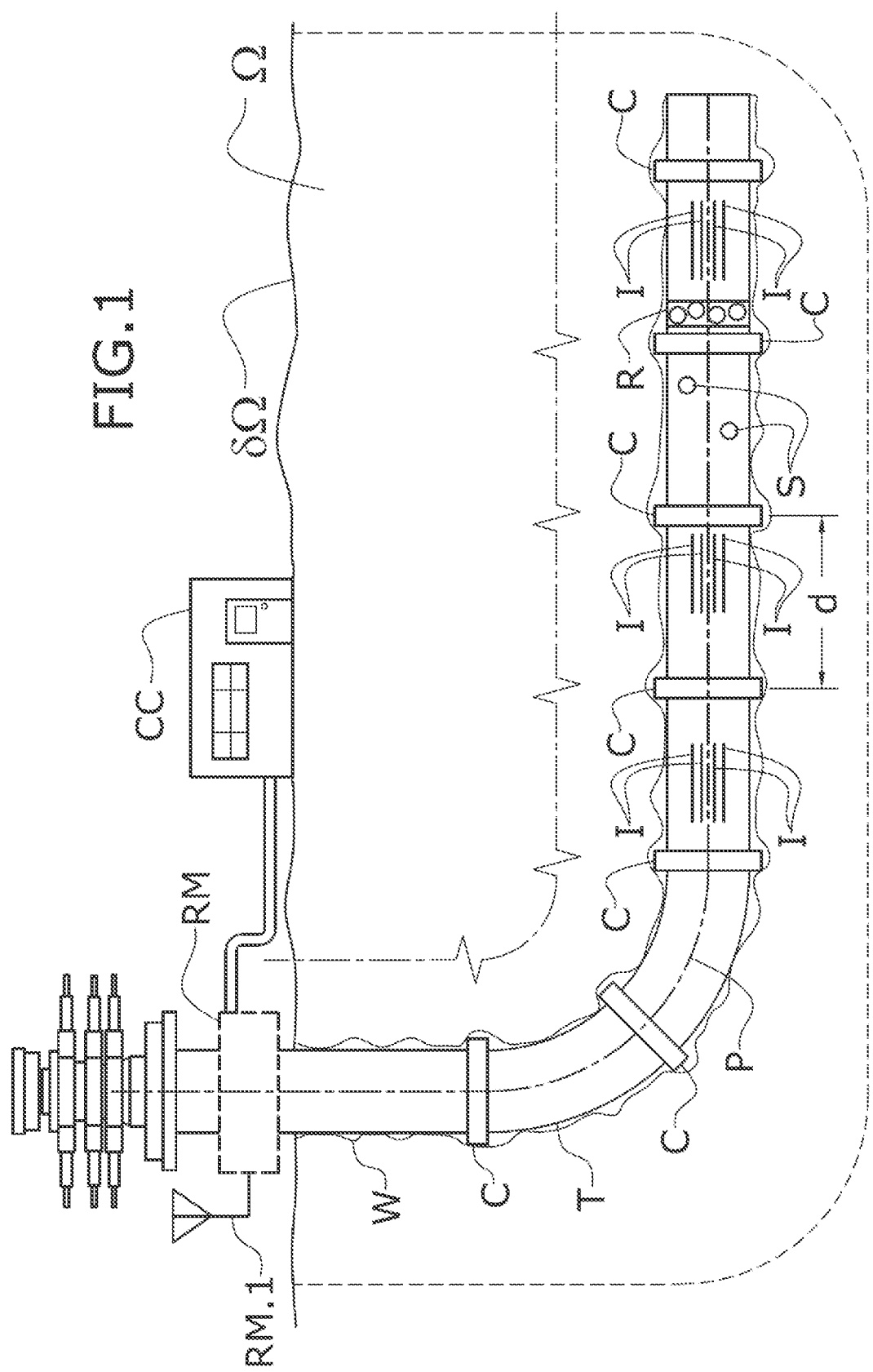
FIG. 1 This figure shows a schematic view of a preferred embodiment of wellbore having either casing collars or junction upsets or junction enlargements as ferromagnetic irregularity elements and sensor elements adapted to detect the perturbation of said casing collars in the magnetic field of the earth.

FIG. 1 shows a reservoir (Ω) as a subsurface region limited by the upper surface OM and a wellbore (W) comprising a first portion oriented vertically and a second portion oriented horizontally, both portions being connected by a curved transition.

The wellbore (W) is represented showing a width intentionally non-proportional to its length, that is, the width being larger according to any real proportion if compared to its length. This non-proportional figure allows showing the structure and elements that will be further disclosed in a clearer manner.

The wellbore (W) has a casing (T) which provides structural stability and an interface between the inner space of the wellbore (W) and the surrounding rock and fluids stored in the reservoir (Ω).

According to this embodiment the casing (T) comprises groups of inlet ports (I) being clustered in groups of grooves and/or holes allowing the fluid or fluids to pass through. For instance, during the production of the wellbore (T), the inlet ports (I) allows the oil and/or gas to flow from the reservoir into the inner space of the casing (T) and then flowing to the exit of the casing (T).

These groups of inlet ports (I) shows a first arrangement non-equally distributed along the longitudinal direction of the wellbore (W) being said longitudinal direction identified as the path (P) of the wellbore (W). This path (P) is represented as the main axis of the casing (T) which is a tube according to a circular section.

The casing (T) comprises a plurality of tube portions, each tube portion showing in one junction or end a collar (C) ring shaped. FIG. 1 shows a separated tube portion indicated by means of an arrow. The collar (C) is a wider segment of the tube portion at one end with an inner diameter configured to house the end of the contiguous tube portion not having the collar (C). The casing (T) is configured concatenating tube portions. The resulting collar (C) arrangement shows said collars (C) with a previously known distance distribution.

In this preferred embodiment the tube portions are made of ferromagnetic material and, as a result, the casing (T) is a ferromagnetic tube with collars (C) with a larger thickness and therefore with more mass of ferromagnetic material.

The collars (C) generate a perturbation of the magnetic field of the earth in their surroundings, in particular in the inner space of the casing (T).

The method according to a preferred embodiment also comprises sensor elements (S) adapted to record in time the magnetic perturbation generated by the magnetic irregularity elements formed by the collars (C) when said sensor elements (S) are traveling in the inner space of the casing (T) being dragged by the flow flowing through said casing (T).

In this description, some expressions may indicate that the sensor elements (S) travel in the inner space of the casing (T) along the path (P) of the wellbore (W). This expression or any equivalent expression should be interpreted as that the main velocity component of the sensor element (S) is according to the path (P) direction but the sensor element (S) may be located at any location of the section of the casing (T). For instance, the sensor element (S) may move along the center of the casing (T), or in other embodiment the sensor element (T) may move near the wall of the casing (T) caused by a buoyancy effect. In any case, the sensor element (S) record the perturbation of the magnetic irregularity element (C) when passing near said magnetic irregularity element (C) according to the path (P) direction.

FIG. 1 shows schematically a signal recorded by a sensor element (S), said signal being represented with the correct correspondence between the signal value and the location where said signal value has been recorded.

Figure 2:
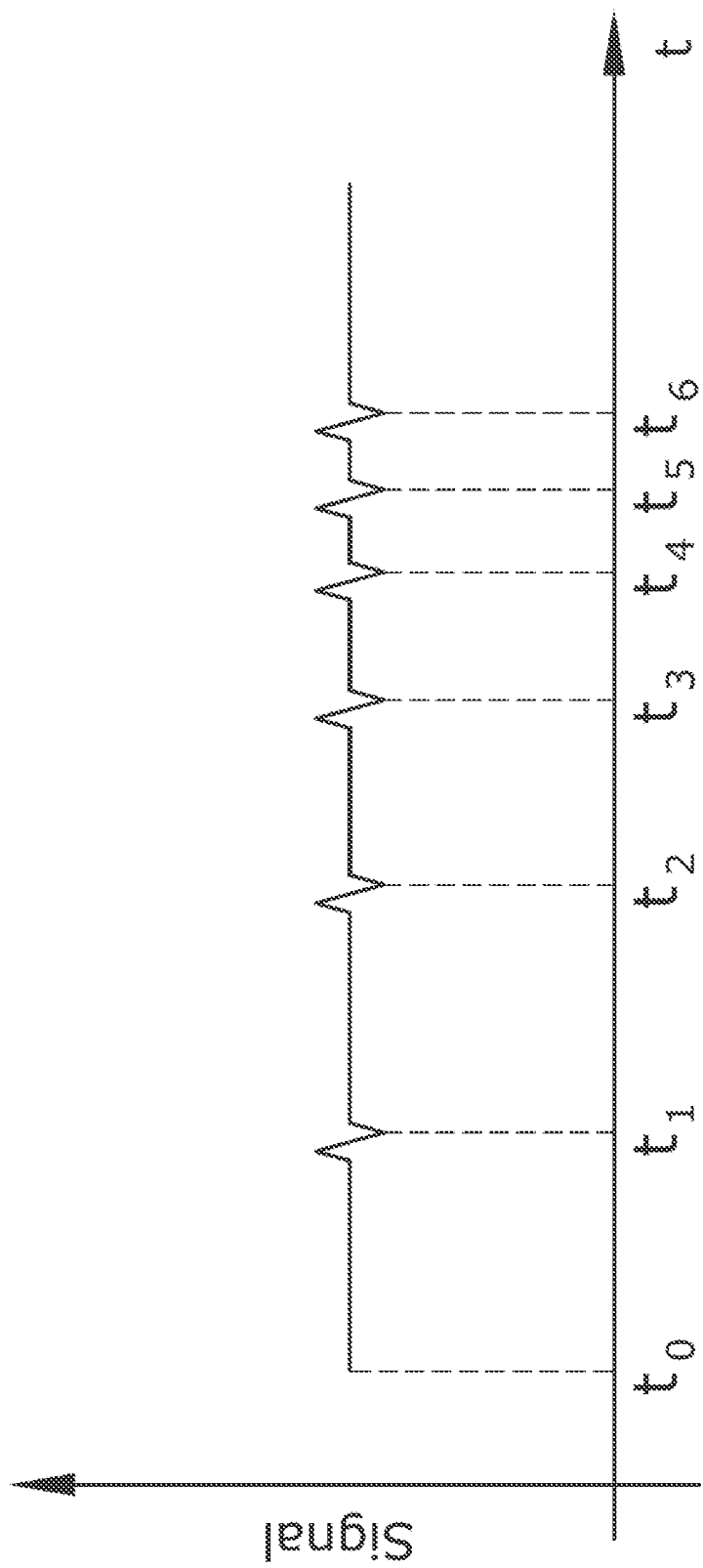
FIG. 2 This figure shows a graphical representation of the signal recorded in time with the pulses corresponding to each detected perturbation.

FIG. 2 shows the signal recorded as in time by a sensor element (S) delivered in a production wellbore where the flow is being increased when passing through sections having inlet ports feeding the inner space of the casing (T). The velocity of the sensor element (S) being dragged by the flow is also being increased and therefore the perturbations identified in the signal function are recorded with shorter intervals of time. Each perturbation detected in the recorded signal has associated a timestamp and, as each timestamp has a correspondence with the known location in the path (P) direction of the magnetic irregularity element. The timestamp and the location in the path direction allow estimating the velocity of the sensor element (S).

That is, signal represented in FIG. 2 has been stretched compressing the separation of the perturbation in time in order to match the perturbation with the location of the collar or casing wall enlargement (C) causing said perturbation.

According to this embodiment, a plurality of sensor elements (S) are stored in a releasing module (R), being the releasing module (R) in communication with a user that controls the delivery of the sensor elements (S). In this embodiment, the releasing module (R) is adapted to deliver one or more sensor elements (S) upon receiving a delivering signal.

Once the sensor element (S) is delivered, it starts at $t_0$ to record the perturbation of the magnetic field at $t_1$, $t_2$, $t_3$, . . . as represented in FIG. 2 wherein the represented signal in FIG. 1 is just an example of signal that shows the position of the collars or casing wall enlargement (C) detected when passing at their location. After recording the magnetic perturbations the production rate may be estimated by post-processing of the recorded data for at least one portion of the wellbore (W) located between a first collar or casing wall enlargement (C) and a second collar or casing wall enlargement (C) by:

identifying in the recorded signal each magnetic perturbation caused when the sensor element (S) dragged by the flow passes near each magnetic irregularity element (C) wherein the location of said magnetic irregularity element (C) in respect to the path (P) of the casing (T) has been previously determined;

determining the time spent by the sensor element (S) being dragged by the flow between the location of the first collar or casing wall enlargement (C) and the second collar or casing wall enlargement (C);

estimating the flow rate as the flow according to a velocity of the fluid, this velocity being computed as the rate between the distance between the first collar or casing wall enlargement (C) and the second collar or casing wall enlargement (C) and, the time spent traveling between said first collar or casing wall enlargement (C) and second collar or casing wall enlargement (C).

This velocity may increase/decrease, and the inlet/outlet flow though the inlet ports (I) located within the portion of casing (T) where the two different velocities has been identified is estimated as the flow required for said variation of velocity according the section of the casing (T). Variation of the flow is assigned to the inlet ports (I) located in the portion of casing (T) where the variation of velocity is identified.

That is, in a particular embodiment, the velocity of the sensor element is determined as the quotient between the spacing between two magnetic irregularity elements (C) and the time elapsed between said two irregularity elements (C). Specifically, the two magnetic irregularity elements (C) are two consecutive irregularities (C).

According to another embodiment, the wellbore (W) is partitioned by portions defined by the locations of the collars or casing wall enlargement (C) and the flow inlet or the flow outlet of fluid through the inlet (I) ports located between two consecutive collars or casing wall enlargement (C) is estimated from the variation of the estimated velocity value of the sensor element (S) taken when exiting the portion in respect to the value taken when entering into the portion.

In the embodiment shown in FIG. 1, the inlet ports (I) are clustered throughout the path (P) direction wherein each group of inlet ports (I) are a set of grooves or holes distributed peripherally in the casing (T) at a determined location of the path (P).

In this preferred embodiment, the sensor element (S) is a passive device measuring and recording in time perturbations of the magnetic field of the earth caused in the vicinity of the ferromagnetic irregularities caused by the increased thickness of the collars or casing wall enlargement (C). In other embodiment where the casing (T) is a continuous tube, the magnetic irregularity elements (S) are pieces made of ferromagnetic material fixed to the wall of the casing (T) according to a predetermined arrangement, being the location of the pieces known.

According to another embodiment, the sensor element (S) is an active device generating a magnetic field being perturbed by the magnetic irregularity element or casing wall enlargement (C) located in the casing (T). In this case, the sensor element (S) also comprises an energy source that is activated when the sensor element is delivered.

In the preferred embodiment, sensor element (S) also comprises an energy source allowing to record in time the magnetic perturbations being measured but, if the sensor element (S) is active the energy source has a larger capacity as it may feed the sensor element (S) until all the measurements has been done. For instance, the sensor element (S) must be active during the travel time along the whole wellbore (W).

In the preferred embodiment, sensor elements (S) are stored in a releasing module (R) in the wellbore (W) at the location of the wellbore (W) located in the subsurface OM where the fluids flows and wherein said releasing module (R) is adapted to release one or more sensor elements (S) during the production of the wellbore (W).

In this preferred embodiment, the releasing module (R) is adapted to deliver one or more sensor elements (S) upon receiving a delivering signal, for instance generated by a user from a control center being in communication with the releasing module (R). This embodiment allows spending sensor elements (S) only when they are needed throughout the entire life of the wellbore (W).

According to another embodiment, the releasing module (R) comprises a plurality of sensor elements (S) at least partially embedded by a solvable substance allowing to release one or more sensor elements (S) when said solvable substance is dissolved. The configuration of the package and the solvable substance may be designed for a time space delivery process. This configuration avoids the need of installing a communication system with the releasing module (R).

Figure 3:
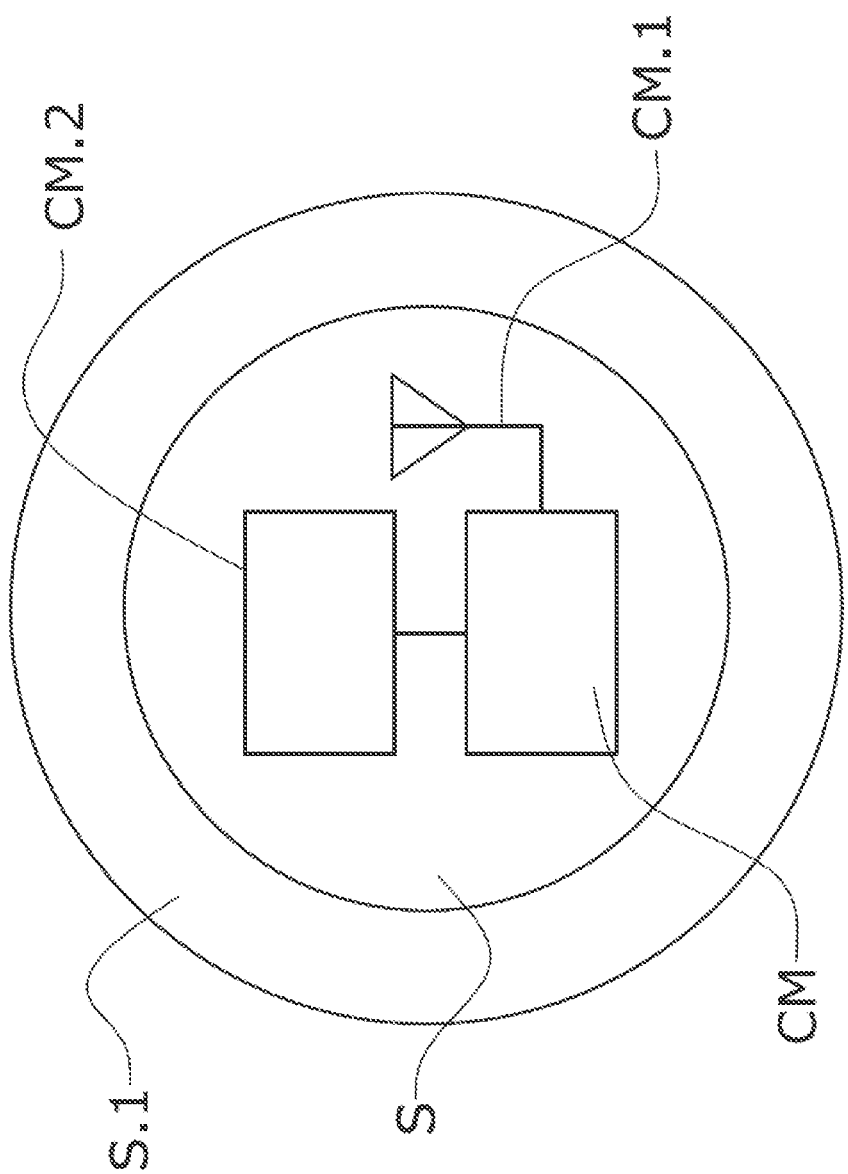
FIG. 3 This figure shows schematically a sensor element according to a specific embodiment comprising a coating for determining a predefined weight and volume.

In this preferred embodiment, the at least one sensor element (S) comprises a communication module (CM) for transferring the recorded data when receiving a triggering signal. FIG. 3 shows an schematic representation of a sensor element (S) with a communication module (CM) having an antenna (CM.1) and being in communication with a simple processing unit (CM.2) for recording and storing the perturbation signal.

Once the sensor element (S) has recorded the perturbation signal and has completed the wellbore (W) length to be measured, the recorded data is collected by sending the triggering signal to the sensor element (S) which sends the recorded data being transmitted by the communication module (CM).

A reading module (RM), in this embodiment this reading module (RM) being the module that sends the triggering signal by using its own antenna (RM.1), receives the recorded data and is transmitted to the control center (CC). This transmission process is very fast as the triggering event and the transmission is executed during the travel time of the sensor element (S) when the communication module (CM) is within the range where the communication module (CM) and the reading module (RM) may be in communication in a wireless manner.

According to an alternative embodiment, the sensor elements (S) are captured when exiting the wellbore (W) and then being the recorded data read. In this case, the communication may be in by wire connecting the sensor element (S) with a computer system.

FIG. 3 shows an embodiment of the sensor element (S) having a coating (S.1) with a specific weight. This coating allows determining the weight and volume of the sensor element (S) for causing its floating, a buoyancy effect or settling in said sensor element (S). According to an embodiment, the releasing module (R) comprises a plurality of sensor elements (S) with different weights.

The buoyancy effect, when the portion of the wellbore (W) the sensor element (S) is traveling is horizontal, causes the sensor element to be dragged near the wall of the casing (T) rather than in a central position. This sensor element (S)

is adapted to record the velocity near the wall rather than the velocity about the axis of the casing (T). This velocity may be the velocity defined by the boundary layer of the flow or, if two or more phases exist, this sensor element (S) may be measuring the flow of the plurality of phases: the phase located in the upper part if the weight is relatively low or the lower phase if the weight is relatively high.

In this case where two or more phases are in the flow, two or more different sensor elements (S) are used for having complete information about the flow.

In other embodiment, the sensor element (S) comprises:
a pressure sensor,
a temperature sensor,
a resistivity sensor or,
any combination of them thereof.

The additional information of the fluid, temperature, pressure, resistivity, allows estimating fluid properties of the fluid surrounding the sensor element (S).

A second aspect of the invention is a system comprising:
a wellbore (W) comprising a casing (T) and, the casing (T) comprising a plurality of inlet ports (I) distributed according to a first arrangement along the path (P) allowing the entrance of oil into the wellbore (W) and, the casing (T) also comprising a plurality of magnetic irregularity elements (C) distributed according to a second arrangement along the path (P);
at least one sensor element (S) wherein the sensor element (S) is adapted to record in time a magnetic perturbation generated by a magnetic irregularity element (C) when the at least one sensor element (S) is moving within the casing (T) and passing through the section of the wellbore (W) where the said magnetic irregularity element (C) is located according to the path (P) direction; and,
a releasing module (R) located within the casing (T) comprising the at least one sensor element (S).

According to another aspect of the invention, any of the disclosed methods may be provided in a form of a computer program product adapted to carry out said methods.

The invention claimed is:

1. Method for estimating either flowback or the reservoir fluid production rate from either one individual inlet or the contribution from several inlets separated by intervals in a wellbore located in an oil and/or gas reservoir (Ω), said wellbore (W) being extended along a path (P) at least from a point of the surface of the reservoir (Ω) until a point in the subsurface, the wellbore (W) comprising:
a casing (T) comprising a plurality of inlet ports (I) distributed according to a first arrangement along the path (P) allowing the entrance of fluid into the casing (T) and, the casing (T) also comprising a plurality of magnetic irregularity elements (C) distributed according to a second arrangement along the path (P);
at least one sensor element (S) wherein the sensor element (S) is adapted to record in time the magnetic perturbation generated by a magnetic irregularity element (C) when the at least one sensor element (S) is moving within the casing (T) and passing through a section of the wellbore (W) where the said magnetic irregularity element (C) is located according to the path (P) direction;
wherein the method comprises:
delivering at least one sensor element (S) to flowing fluid in the wellbore (W) within the casing (T) during either flowback or the production of fluid at a location of the wellbore (W) located in the subsurface and where the fluid flows, wherein the sensor element (S) is dragged by the flow of surrounding fluid;
recording by the at least one sensor element (S) the magnetic perturbations caused when the sensor element (S) dragged by the flowing fluid passes near each magnetic irregularity element (C) with known spacing between them, wherein the recording is time-stamped by the sensor element (S) at each magnetic perturbation along the path (P);
when the sensor element (S) has completed a length of the path (P) to be measured, transmitting the timestamped magnetic perturbation recorded data from the sensor element (S) to a control center or a computer system that is exterior to the wellbore;
determining from the timestamped transmitted magnetic perturbations recorded data the estimation of the velocity of the fluid flow as the velocity of the sensor element (S) being dragged by said flow of either flowback or the production of fluid; and
determining the estimation of the flow rate of the flowback or the reservoir fluid production from either one individual inlet port (I) or the contribution from several inlet ports (I) along the path in the wellbore located in the oil and/or gas reservoir (Ω) from the estimation of the velocity of the fluid flow; and
wherein the section of the wellbore (W) through which the sensor element (S) is traveling is horizontal, and the sensor element (S) has a weight determined to show a buoyancy or a sink effect when being submerged within the fluid in order to cause the position of the sensor element (S) in respect to the radial direction of the casing (T) when being dragged by the flow different to the central position of the section of the casing (T) allowing to estimate the velocity of the flow along the radial direction.

2. Method according to claim 1, wherein the velocity of the sensor element is determined as the quotient between the spacing between two magnetic irregularity elements (C) and the time elapsed between said two irregularity elements (C).

3. Method according to claim 1, wherein the magnetic irregularity element (C) is:
a ferromagnetic irregularity element (C) for perturbing the magnetic field of the earth,
a magnet causing a magnetic field perturbing the magnetic field of the earth;
a combination of any of them thereof.

4. Method according to claim 2, wherein the casing (T) is made of a metal comprising a ferromagnetic material and the ferromagnetic irregularity elements (C) are collars or casing wall enlargements, showing a greater thickness in respect to the rest of the casing (T) wall.

5. Method according to claim 1, wherein a plurality of sensor elements (S) are stored in a releasing module (R) in the wellbore (W) at the location of the wellbore (W) located in the subsurface (δΩ) where the fluids flows and wherein said releasing module (R) is adapted to release one or more sensor elements (S) during the production of the wellbore (W).

6. Method according to claim 5, wherein the releasing module (R) comprises a plurality of sensor elements (S) at least partially embedded by a solvable substance allowing to release one or more sensor elements (S) when said solvable substance is dissolved.

7. Method according to claim 1, wherein sensor elements (S) comprises a magnetic field sensor being adapted to detect the earth's magnetic field perturbation caused by the magnetic irregularity element (C) when said sensor element (S) dragged by the flow passes near each magnetic irregularity element (C).

8. Method according to claim 1, wherein sensor elements (S) comprises a source magnetic field and a magnetic field sensor being adapted to detect the magnetic field perturbation caused by the magnetic irregularity element (C) when said sensor element (S) dragged by the flow and passes near each magnetic irregularity element (C).

9. Method according to claim 1, wherein the at least one sensor element (S) comprises a communication module (CM) for transferring the recorded data when receiving a triggering signal, and wherein the recorded data is collected when exiting the wellbore (W) by sending a triggering signal to the at least one sensor element (S) and recording the recorded data transferred by the communication module (CM).

10. Method according to claim 8, wherein the wellbore (W) comprises a reading module (RM) adapted to send a triggering signal to at least one sensor element (S) when said sensor element (S) passes near the location of said reading module (R) and the reading module (RM) being also adapted to read the recorded data of the sensor element (R) transmitted from its communication module (CM).

11. Method according to claim 1, wherein the production rate is estimated for at least one portion of the wellbore (W) located between a first magnetic irregularity element (C) and a second magnetic irregularity element (C) by:
  identifying each magnetic perturbation caused when the sensor element (S) dragged by the flow passes near each magnetic irregularity element (C) wherein the location of said magnetic irregularity element (C) in respect to the path (P) of the casing (T) has been previously determined;
  determining the time spent by the sensor element (S) being dragged by the flow between the location of the first magnetic irregularity element (C) and the second magnetic irregularity element (C);
  estimating the flow rate as the flow according to a velocity of the fluid, this velocity being computed as the rate between the distance between the first magnetic irregularity element (C) and the second magnetic irregularity element (C) and the time spent traveling between said first magnetic irregularity element (C) and second magnetic irregularity element (C).

12. Method according to claim 11, wherein the wellbore (W) is partitioned by portions defined by the locations of the magnetic irregularity elements (C) and the flow inlet or the flow outlet of fluid through the inlet (I) ports located between two consecutive magnetic irregularity elements (C) is estimated from the variation of the estimated velocity value of the sensor element (S) taken when exiting the portion in respect to the value taken when entering into the portion.

13. Method according to claim 1, wherein at least one sensor (S) comprises:
  a pressure sensor,
  a temperature sensor,
  a resistivity sensor or,
  any combination of them thereof;

allowing to estimate fluid properties of the fluid surrounding the sensor element (S).

14. Method according to claim 1, wherein the sensor element (S) comprises a coating (S.1) for determining the weight and volume of said sensor element (S) and its floating, buoyancy or settling in the fluid.

15. A system comprising:
  a wellbore (W) comprising a casing (T), the casing (T) comprising a plurality of inlet ports (I) distributed according to a first arrangement along the path (P) allowing the entrance of oil into the wellbore (W), and the casing (T) also comprising a plurality of magnetic irregularity elements (C) distributed according to a second arrangement along the path (P);
  at least one sensor element (S) wherein the sensor element (S) is adapted to record in time a magnetic perturbation generated by a magnetic irregularity element (C) when the at least one sensor element (S) is moving within the casing (T) dragged by the flow of surrounding fluid and passing through the section of the wellbore (W) where the said magnetic irregularity element (C) is located according to the path (P) direction, wherein the recording is timestamped by the sensor element (S) at each magnetic perturbation along the path (P), and the sensor element (S) when the sensor element (S) has completed a length of the path (P) to be measured, transmits the time stamped magnetic perturbation recorded data to a control center or a computer system that is exterior to the wellbore, for determining from the timestamped transmitted magnetic perturbations recorded data an estimation of the velocity of the fluid flow as the velocity of the sensor element (S) being dragged by the surrounding fluid, and determining an estimation of flow rate of fluid along the path (P) of the wellbore (W) from the estimation of the velocity of the fluid flow; and
  a releasing module (R) located within the casing (T) comprising the at least one sensor element (S),
  wherein the casing (T) through which the at least one sensor element (S) is dragged by the surrounding fluid comprises a horizontal casing portion comprising the section of the wellbore (W) where the said magnetic irregularity element (C) is located according to the path (P) direction, and wherein each of the at least one sensor element (S) has a weight producing a buoyancy or sink effect so that when it is dragged by the surrounding fluid through said horizontal casing portion comprising the section of the wellbore (W) where the said magnetic irregularity element (C) is located according to the path (P) direction, it has a position that is radially displaced from a central axis of the casing.

* * * * *

UNITED STATES PATENT AND TRADEMARK OFFICE
CERTIFICATE OF CORRECTION

PATENT NO. : 11,629,590 B2
APPLICATION NO. : 17/045174
DATED : April 18, 2023
INVENTOR(S) : Ricardo Cesar Bezerra De Melo It is certified that error appears in the above-identified patent and that said Letters Patent is hereby corrected as shown below:

In the Specification

Column 5, Line 37, "upper surface OM" should be -- upper surface ($\delta\Omega$) --.

Column 8, Line 8, "subsurface OM" should be -- subsurface ($\delta\Omega$) --.

Signed and Sealed this
Sixteenth Day of May, 2023

Katherine Kelly Vidal
*Director of the United States Patent and Trademark Office*